United States Patent
Oomura

(10) Patent No.: US 8,970,247 B2
(45) Date of Patent: Mar. 3, 2015

(54) SEMICONDUCTOR INTEGRATED CIRCUIT DEVICE WITH PROTECTION AGAINST TAMPERING

(75) Inventor: Masanobu Oomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 13/196,321

(22) Filed: Aug. 2, 2011

(65) Prior Publication Data

US 2012/0056639 A1 Mar. 8, 2012

(30) Foreign Application Priority Data

Sep. 2, 2010 (JP) ................................ 2010-197143
Jun. 22, 2011 (JP) ................................ 2011-138894

(51) Int. Cl.
*G01R 31/26* (2014.01)
*H01L 23/00* (2006.01)
*H03K 3/03* (2006.01)
*H03K 5/19* (2006.01)

(52) U.S. Cl.
CPC ............ *H01L 23/576* (2013.01); *H03K 3/0315* (2013.01); *H03K 5/19* (2013.01)
USPC .................................................. 324/762.03

(58) Field of Classification Search
None
See application file for complete search history.

(56) References Cited

U.S. PATENT DOCUMENTS

| | | | | |
|---|---|---|---|---|
| 5,283,764 A * | 2/1994 | Kim et al. | ...................... | 365/222 |
| 5,533,505 A * | 7/1996 | Kallstrand et al. | ........ | 128/203.15 |
| 5,815,043 A * | 9/1998 | Chow et al. | ..................... | 331/57 |
| 5,998,858 A * | 12/1999 | Little et al. | ..................... | 257/678 |
| 6,833,725 B2 * | 12/2004 | Ohkawa et al. | ............ | 324/750.3 |
| 7,489,204 B2 * | 2/2009 | Habitz et al. | ..................... | 331/44 |
| 7,525,330 B2 | 4/2009 | De Jongh et al. | ............. | 324/763 |
| 2006/0214280 A1 | 9/2006 | Mizuno et al. | ................ | 257/692 |
| 2008/0157893 A1 * | 7/2008 | Krah | ........................ | 331/177 R |

FOREIGN PATENT DOCUMENTS

| | | |
|---|---|---|
| CN | 1256565 | 6/2000 |
| JP | 08-115267 | 5/1996 |
| JP | 2005-514674 | 5/2005 |
| JP | 2006-012159 | 1/2006 |

OTHER PUBLICATIONS

Office Action issued Nov. 5, 2013 in counterpart Chinese patent application 201110251651.4, with translation.
Office Action issued Jul. 14, 2014 in counterpart Chinese patent application 201110251651.4, with translation.

* cited by examiner

*Primary Examiner* — Vinh Nguyen
(74) *Attorney, Agent, or Firm* — Fitzpatrick, Cella, Harper & Scinto

(57) ABSTRACT

A semiconductor integrated circuit device has a circuit block formed on a semiconductor substrate, and an electrically conductive pattern formed in an upper layer of a portion of the circuit block that is to be protected. An oscillation circuit is connected to the electrically conductive pattern, and is configured to oscillate at an oscillation frequency determined by a circuit constant of the electrically conductive pattern, and a detection circuit is configured to determine whether a preset range includes the oscillation frequency of the oscillation circuit.

12 Claims, 8 Drawing Sheets

F I G. 1
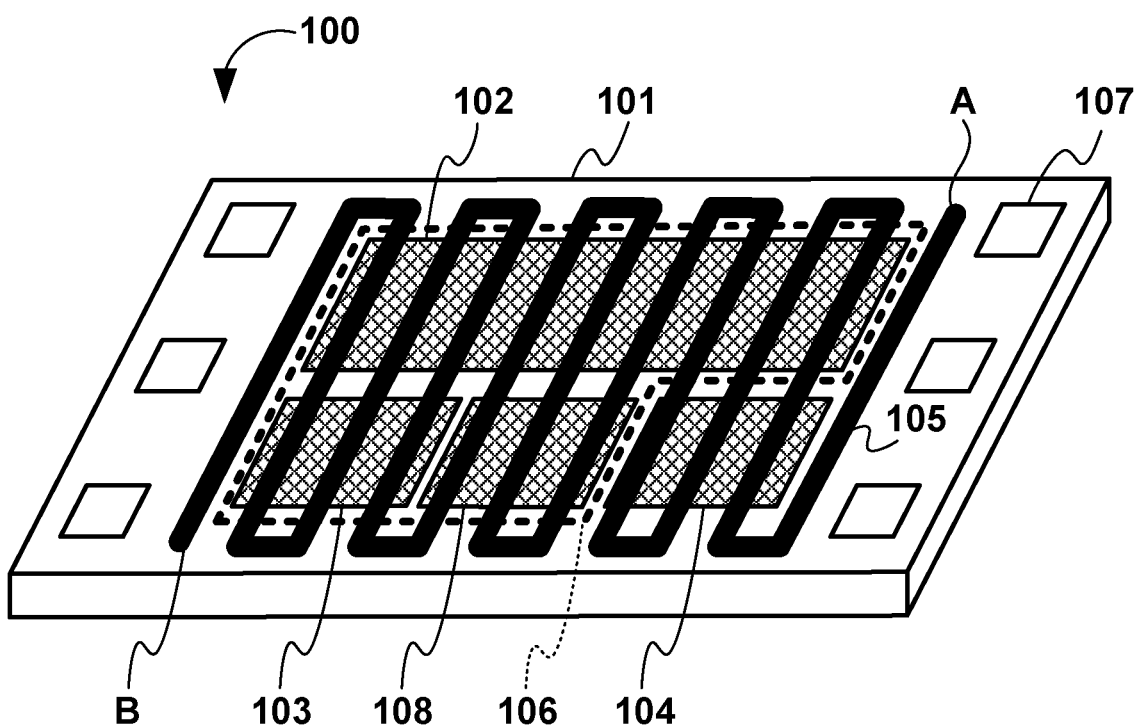

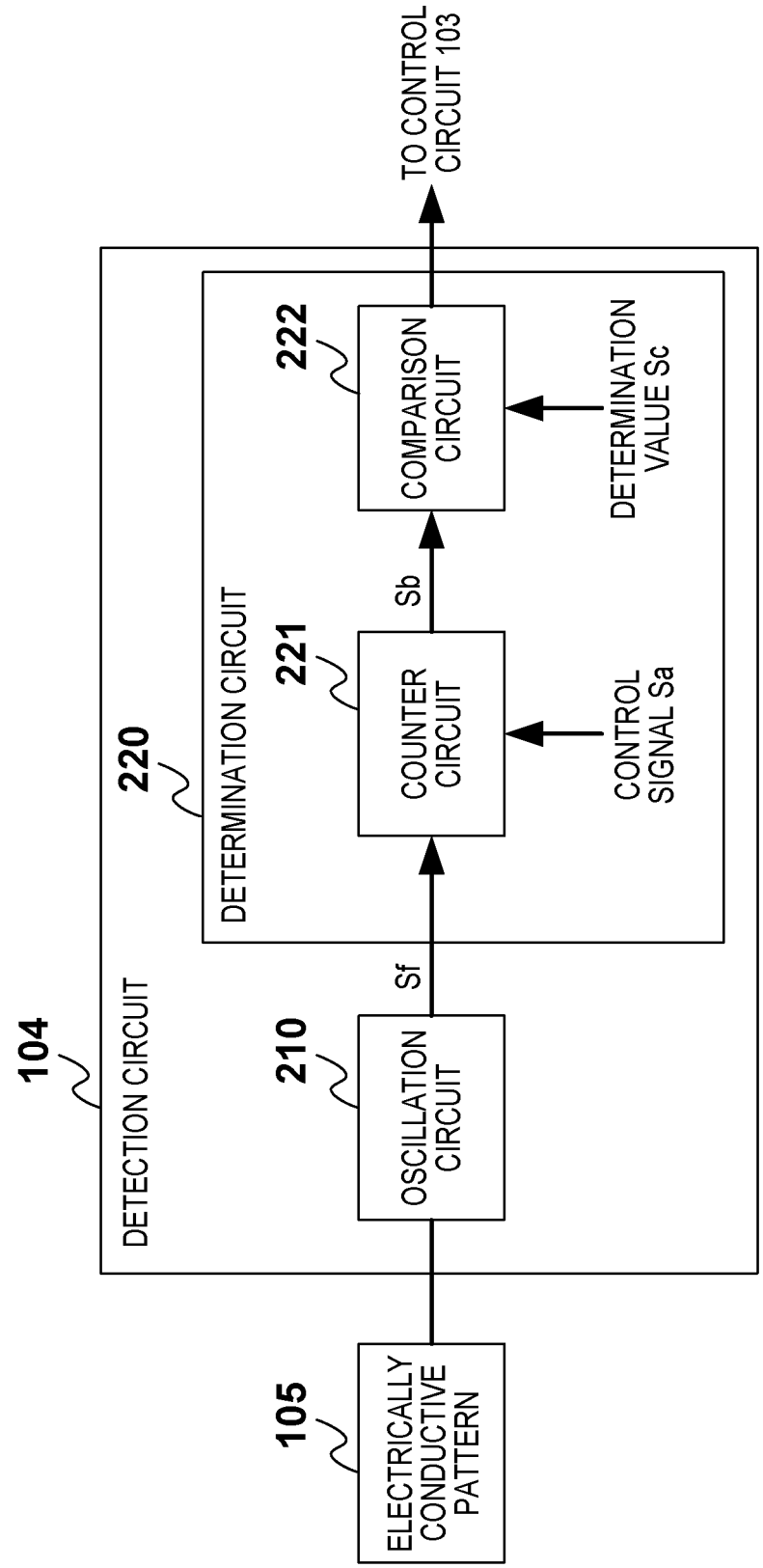

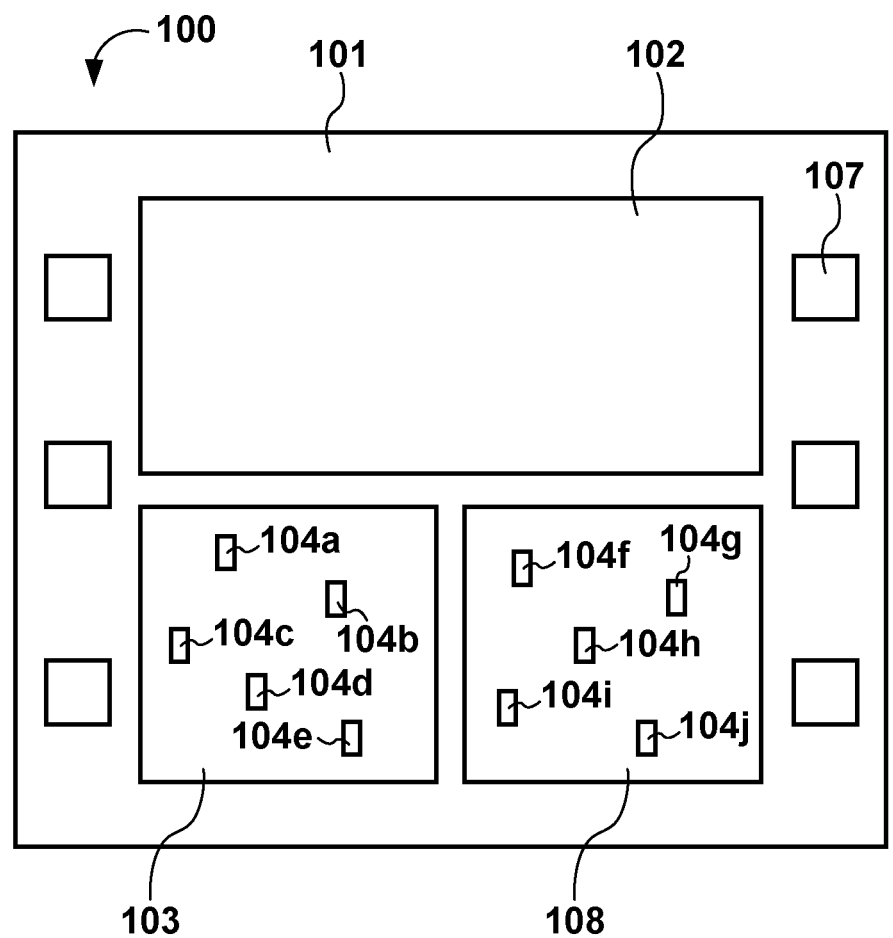

SEMICONDUCTOR INTEGRATED CIRCUIT DEVICE WITH PROTECTION AGAINST TAMPERING

BACKGROUND OF THE INVENTION

1. Field of the Invention

The present invention relates to a semiconductor integrated circuit device.

2. Description of the Related Art

Demand has arisen for protecting, against physical alteration and analysis, a circuit mounted on a semiconductor integrated circuit device for holding data requiring high security such as personal information. In the semiconductor integrated circuit device described in Japanese Patent Laid-Open No. 2006-012159, a wiring line is formed on a circuit to be protected. When detecting a change in voltage of this wiring line, a detection circuit of the semiconductor integrated circuit device determines that the wiring line has been altered. However, a focused ion beam (FIB) apparatus has recently become usable. When using the FIB apparatus, it is possible to cut a wiring line by emitting an ion beam from the front surface of a semiconductor integrated circuit device, and deposit a wiring metal. Even when a circuit is protected using the technique described in Japanese Patent Laid-Open No. 2006-012159, therefore, if the FIB apparatus is used to deposit a wiring metal so as to bypass a portion to be analyzed and apply a predetermined voltage, it is possible to cause a recognition error, that is, it is possible to cause the determination operation of the detection circuit to detect a normal state instead of an abnormal state.

SUMMARY OF THE INVENTION

The method described above of forming an electrically conductive pattern on a circuit block to be protected and detecting the change in potential of this electrically conductive pattern cannot accurately detect alterations to the electrically conductive pattern. Accordingly, an aspect of the present invention provides a technique for improving the accuracy of detection of alterations to an electrically conductive pattern formed on a circuit block to be protected.

An aspect of the present invention provides a semiconductor integrated circuit device comprising: a circuit block formed on a semiconductor substrate; an electrically conductive pattern formed in an upper layer of a portion to be protected of the circuit block; an oscillation circuit connected to the electrically conductive pattern, and configured to oscillate at an oscillation frequency determined by a circuit constant of the electrically conductive pattern; and a detection circuit configured to determine whether a preset range includes the oscillation frequency of the oscillation circuit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a view for explaining an example of the arrangement of a semiconductor integrated circuit device of an embodiment of the present invention;

FIG. 2 is a view for explaining an example of a detailed configuration of a detection circuit of the embodiment of the present invention;

FIG. 9 is a view for explaining an example in which the detection circuit 104 is dispersed according to an embodiment of the present invention.

DESCRIPTION OF THE EMBODIMENTS

Figure 3A:
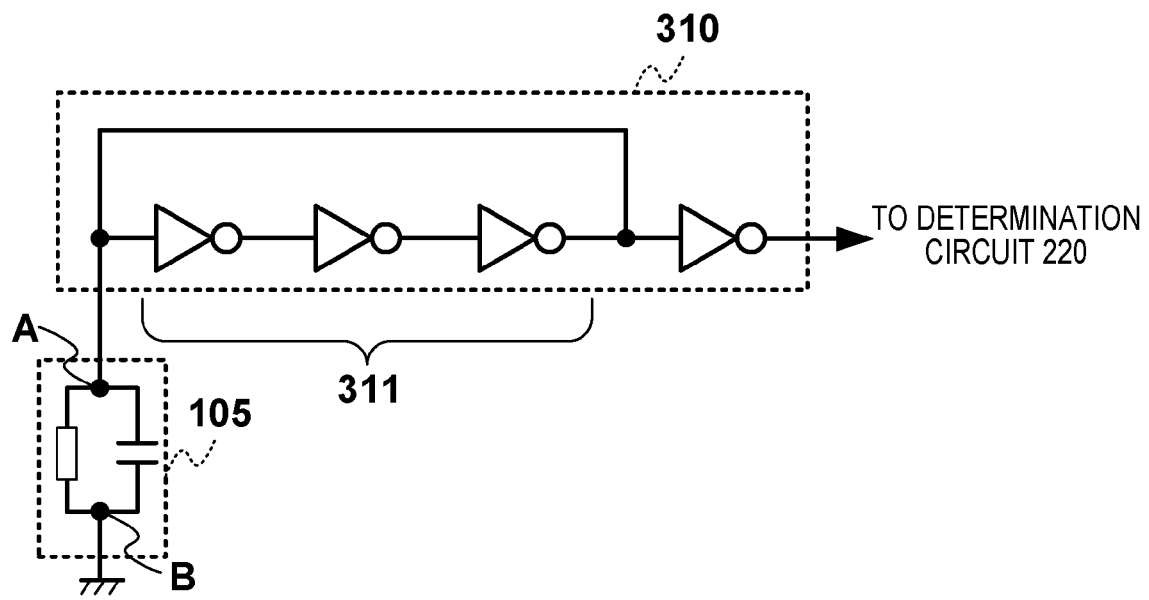
FIGS. 3A and 3B are views for explaining examples of a detailed configuration of an oscillation circuit of the embodiment of the present invention.

Embodiments of the present invention will be explained below with reference to the accompanying drawings. A configuration example of a semiconductor integrated circuit device 100 according to an embodiment of the present invention will now be explained with reference to FIG. 1. A semiconductor integrated circuit device 100 can include a memory circuit 102, control circuit 103, processing circuit 108, and detection circuit 104 formed over a semiconductor substrate 101. The memory circuit 102 can include at least one of a nonvolatile memory and volatile memory, and hold data. The control circuit 103 is, for example, a CMOS logic circuit, and can control access of the processing circuit 108 to data held in the memory circuit 102. That is, the control circuit 103 can control write of data to the memory circuit 102 by the processing circuit 108, and read of data from the memory circuit 102 by the processing circuit 108. The processing circuit 108 can process data held in the memory circuit 102, and output the generated data to, for example, an output device. The memory circuit 102, control circuit 103, and processing circuit 108 can form a circuit block 106. The circuit block 106 can be connected to an external device via terminals 107.

An electrically conductive pattern 105 is formed on a circuit block 106. In the example shown in FIG. 1, the electrically conductive pattern 105 is formed by one bent electrically conductive line, and meanders so as to cover all the surfaces of the memory circuit 102, control circuit 103, and detection circuit 104. The electrically conductive pattern 105 need not be formed on all circuits, and need at least be formed over a portion to be protected. For example, the electrically conductive pattern 105 may be formed on a portion of the circuit block 106. That is, the electrically conductive pattern 105 may be formed on only one of the memory circuit 102, control circuit 103, and processing circuit 108. The electrically conductive pattern 105 can also be formed densely so as to prevent a circuit to be protected from being analyzed from above the electrically conductive pattern 105. To increase the change in circuit constant before and after the electrically conductive pattern 105 is altered, it is also possible to form the electrically conductive pattern 105 by the critical dimension of the manufacturing process of the semiconductor integrated circuit device 100. In this embodiment, "over the circuit block 106" means any layer above the layer forming the circuit block 106 based on the semiconductor substrate 101. Also, the electrically conductive pattern 105 may be surrounded by an insulator. This insulator can be formed by, for example, a silicon oxide film as an interlayer dielectric film of a semiconductor device.

The detection circuit 104 is connected to the electrically conductive pattern 105, and can detect that the electrically conductive pattern 105 has been altered. One example of an alteration of the electrically conductive pattern 105 is the removal of the electrically conductive pattern 105, or a pattern change such as a cut or a reconnection. A detailed configuration of the detection circuit 104 and the connection between the detection circuit 104 and electrically conductive pattern 105 will be described later. The detection circuit 104 and control circuit 103 are connected by, for example, wiring lines and wire bonding, and the detection circuit 104 can output the detection result to the control circuit 103. If the detection circuit 104 detects that the electrically conductive pattern 105 has been altered, the control circuit 103 can prevent the processing circuit 108 from using data held in the memory circuit 102. For example, to prevent the use of data, the control circuit 103 can inhibit access of the processing circuit 108 to the memory circuit 102, or reset data held in the memory circuit 102. Data reset herein mentioned is an operation of changing the state of the memory circuit 102 such that no data is held in it. Examples are data erase and random data overwrite. When the memory circuit 102 includes a volatile memory, the control circuit 103 may reset data by stopping power supply to the memory circuit 102.

Next, an example of a detailed configuration of the detection circuit 104 will be explained with reference to FIG. 2. The detection circuit 104 can include an oscillation circuit 210 and determination circuit 220. The determination circuit 220 can include a counter circuit 221 and comparison circuit 222. The oscillation circuit 210 is connected to the electrically conductive pattern 105, and oscillates at an oscillation frequency determined by the circuit constant of the electrically conductive pattern 105. The circuit constant of the electrically conductive pattern 105 includes a parasitic resistance value and parasitic capacitance value of the electrically conductive pattern 105. An output signal Sf from the oscillation circuit 210 is supplied to the counter circuit 221. A control signal Sa is also supplied to the counter circuit 221, and the counter circuit 221 counts the oscillation frequency while the control signal Sa is High. A count Sb obtained by the counter circuit 221 is supplied to the comparison circuit 222. A determination value Sc is also supplied to the comparison circuit 222, and the comparison circuit 222 can determine whether a range defined by the determination value Sc includes the count Sb. In general, the comparison circuit 222 in the determination circuit 220 is at least configured to determine whether a preset range includes the oscillation frequency of the oscillation circuit 210. The detection circuit 220 may be further configured to detect that the electrically conductive pattern 105 has been altered if the preset range does not include the oscillation frequency. The pulse width of the control signal Sa and the determination value Sc can be preset. For example, these values can be set and held in the detection circuit 104 when the semiconductor integrated circuit device 100 is manufactured, and can also be set when a user starts using the semiconductor integrated circuit device 100 after it is shipped. When the user freely sets the pulse width of the control signal Sa and the determination value Sc, the user can hold reference information of these values in the memory circuit 102, and the control circuit 103 can generate the pulse width of the control signal Sa and the determination value Sc based on the information. The nonvolatile memory of the memory circuit 102 may also hold the pulse width of the control signal Sa and the determination value Sc. In this case, the pulse width of the control signal Sa and the determination value Sc cannot be used any longer if the electrically conductive pattern 105 is altered. However, it is still possible to hold these values in the memory circuit 102, because the user perhaps discards the semiconductor integrated circuit device 100 in which the electrically conductive pattern 105 is altered.

The following arrangement is possible as another configuration example of the detection circuit 104. An active element having a circuit constant equal to that of the electrically conductive pattern 105 is formed on a semiconductor substrate, and connected to another oscillation circuit (a second oscillation circuit) formed to have the same arrangement as that of an oscillation circuit 210 (a first oscillation circuit) connected to the electrically conductive pattern 105. An output signal Sf from the oscillation circuit 210 and an output signal from the second oscillation circuit are input to a counter circuit 221 via an AND circuit, and an output signal Sb from the counter circuit 221 is input to a comparison circuit 222. In this arrangement, however, if the frequency of the output signal Sf from the oscillation circuit 210 and that of the output signal from the second oscillation circuit are slightly different, a glitch or short-pulse signal may be output as the output signal from the AND circuit, and the operation of the counter circuit 221 may become unstable.

If the range of the determination value Sc includes the count Sb, the detection circuit 104 detects that the electrically conductive pattern 105 has not been altered, and outputs the detection result to the control circuit 103. If the range of the determination value Sc does not include the count Sb, the detection circuit 104 detects that the electrically conductive pattern 105 has been altered, and outputs the detection result to the control circuit 103.

Figure 3B:
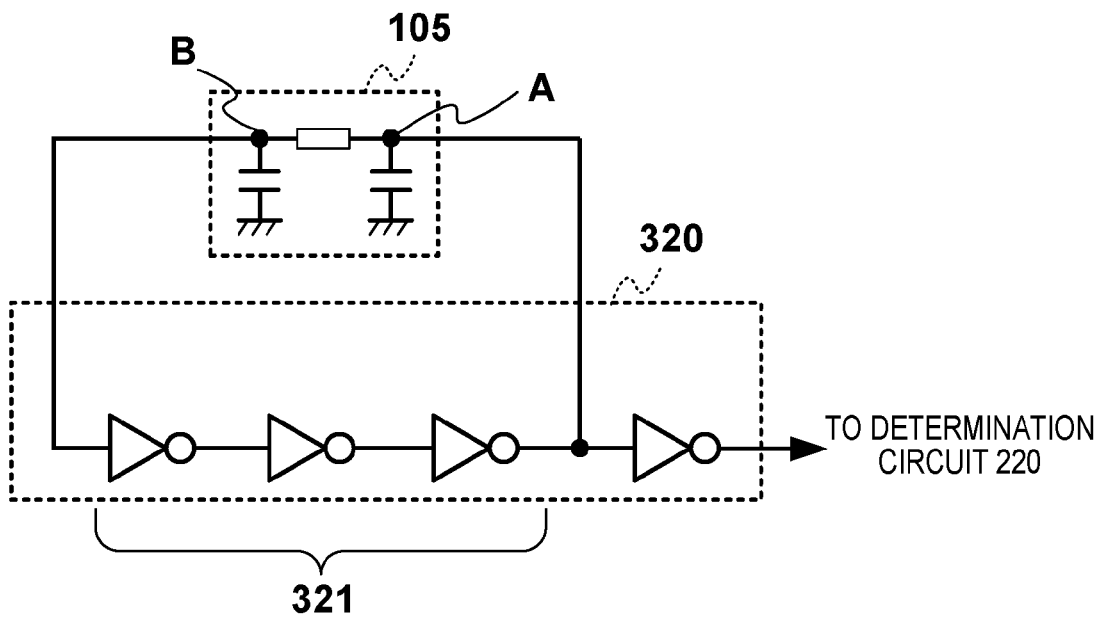

Two examples of a detailed configuration of the oscillation circuit 210 will be explained below with reference to FIGS. 3A and 3B. FIGS. 3A and 3B both show a configuration in which the oscillation circuit includes a ring oscillator circuit, and differ from each other in the connection between the oscillation circuit and electrically conductive pattern 105. Points A and B of the electrically conductive pattern 105 shown in FIGS. 3A and 3B respectively correspond to the points A and B of the electrically conductive pattern 105 shown in FIG. 1.

An oscillation circuit 310 shown in FIG. 3A includes a ring oscillator circuit 311 in which a plurality of and an odd number of (for example, three) inverter circuits are connected in the form of a ring. Of the inverter circuits forming the ring oscillator circuit 311, the input terminal of the first inverter circuit (on the left side of FIG. 3A) is connected to the point A (a first portion) of the electrically conductive pattern 105. Also, the point B (a second portion) of the electrically conductive pattern 105 is connected to a reference potential line (for example, GND). In this arrangement, the resistance component and capacitance component of the electrically conductive pattern 105 can be regarded as they are connected in parallel between the points A and B. Of the inverter circuits forming the ring oscillator circuit 311, the output terminal of the last inverter circuit (on the right side of FIG. 3A) is connected to the determination circuit 220 via an inverter circuit.

An oscillation circuit 320 shown in FIG. 3B includes a ring oscillator circuit 321 in which a plurality of odd-numbered (for example, three) inverter circuits are connected in the form of a ring via the electrically conductive pattern 105. Of the inverter circuits forming the ring oscillator circuit 321, the input terminal of the first inverter circuit (on the left side of FIG. 3B) is connected to the point B (the second portion) of the electrically conductive pattern 105. Also, of the inverter circuits forming the ring oscillator circuit 321, the output terminal of the last inverter circuit (on the right side of FIG. 3B) is connected to the point A (the first portion) of the electrically conductive pattern 105. In this arrangement, the resistance component of the electrically conductive pattern 105 can be regarded as being connected between the points A and B, and the capacitance component can be regarded as being connected between the reference potential line and the points A and B. Of the inverter circuits forming the ring oscillator circuit 321, the output terminal of the last inverter circuit (on the right side of FIG. 3B) is connected to the determination circuit 220 via an inverter circuit.

Regardless of whether the oscillation circuit 210 has the configuration shown in FIG. 3A or 3B, the circuit constant of the electrically conductive pattern 105 determines the oscillation frequency. Accordingly, the oscillation frequency of the oscillation circuit 210 changes if the electrically conductive pattern 105 is altered. For example, the oscillation frequency of the oscillation circuit 310 shown in FIG. 3A increases if the electrically conductive pattern 105 is removed or cut. Also, the oscillation circuit 320 shown in FIG. 3B stops operating if the electrically conductive pattern 105 is removed or cut, because the loop of the ring oscillator circuit 321 is cut. As a consequence, the oscillation frequency becomes zero. The oscillation circuit 210 is not limited to a circuit using the ring oscillator circuit, and may also be a circuit using a Schmitt trigger circuit or a circuit using a multi-vibrator circuit.

Figure 4:
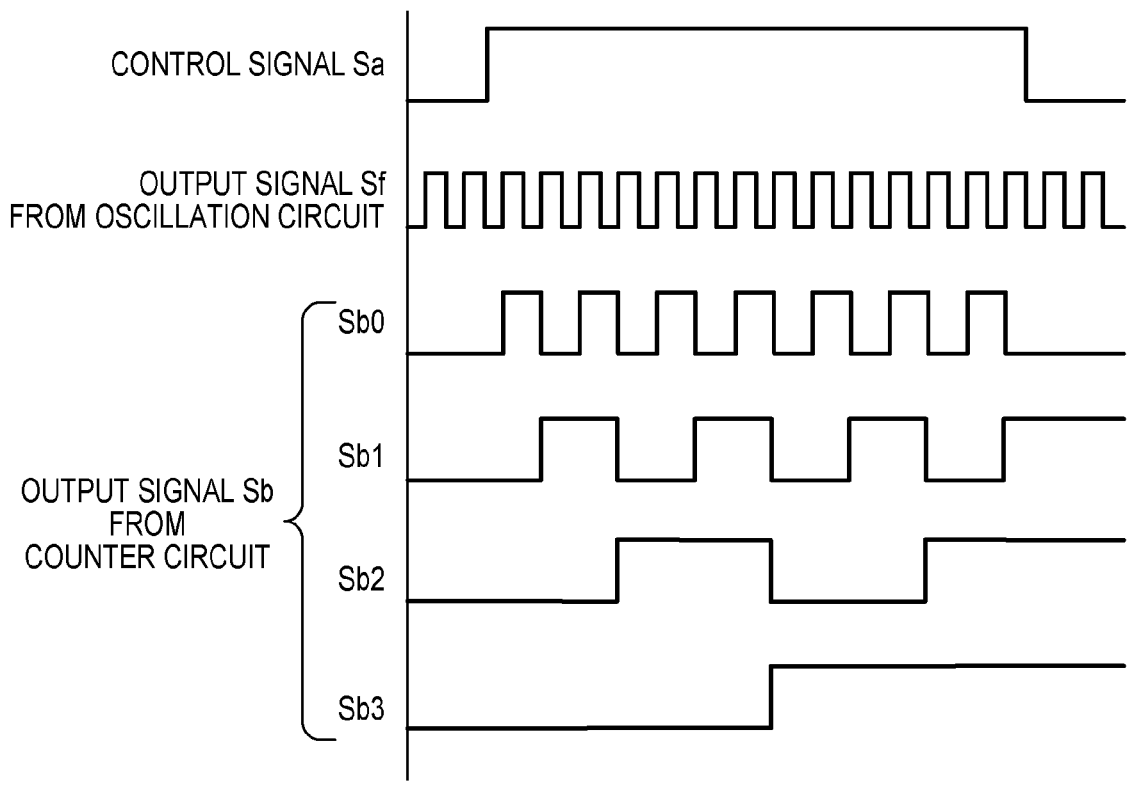
FIG. 4 is a view for explaining an example of a timing chart of a counter circuit of the embodiment of the present invention.

An example of a timing chart of the counter circuit 221 will be explained below with reference to FIG. 4. FIG. 4 shows a four-bit operation of the counter circuit 221 as an example. As described previously, the control signal Sa and the signal Sf from the oscillation circuit 210 are supplied to the counter circuit 221. Based on these signals, the counter circuit 221 counts the number of times the signal Sf changes from Low to High while the control signal Sa is High. As a result, the count Sb is output. In the example shown in FIG. 4, the count Sb is output as four-bit signals Sb0 to Sb3. Sb0 represents the least significant bit of the count Sb, and Sb3 represents the most significant bit of the count Sb. Although not shown, the signals Sb0 to Sb3 are reset to Low after counting is complete, that is, after the control signal Sa becomes Low.

Figure 5:
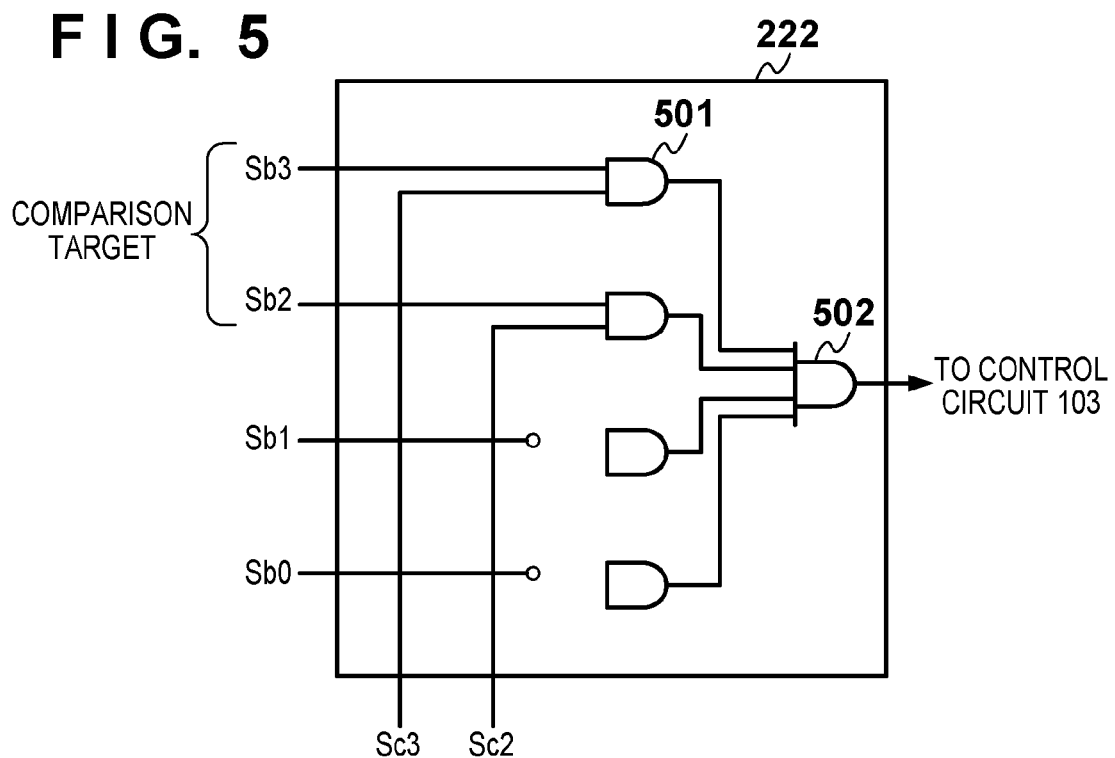
FIG. 5 is a view for explaining an example of the circuit configuration of a comparison circuit of the embodiment of the present invention.

An example of the circuit configuration of the comparison circuit 222 will be explained below with reference to FIG. 5. The counts Sb0 to Sb3 described above and bits Sc2 and Sc3 forming the determination value Sc are supplied to the comparison circuit 222. In the example shown in FIG. 5, the comparison circuit 222 determines whether the range defined by the determination value Sc includes the count by comparing the upper two bits of the count Sb with the determination value Sc. Both Sb3 and Sc3 are supplied to an AND circuit 501, and the output from the AND circuit 501 is input to an AND circuit 502. This similarly applies to Sb2 and Sc2. Sb1 and Sb0 are discarded. The output from the AND circuit 502 is input as a detection result to the control circuit 103.

If Sb3 and Sc3 match and Sb2 and Sc2 match, the output from the AND circuit 502 becomes High. This represents that the detection circuit 104 detects that the electrically conductive pattern 105 has not been altered. If the values of at least one of these pairs do not match, the output from the AND circuit 502 becomes Low. This represents that the detection circuit 104 detects that the electrically conductive pattern 105 has been altered. The number of values included in the range defined by the determination value Sc can be increased or decreased by increasing or decreasing the number of comparison target bits of the count Sb. For example, to determine whether the count Sb is included in a range having four values, bits other than the lower two bits of the count Sb need only be compared with the determination value Sc. To determine whether the count Sb is included in a range having one value, that is, whether the count Sb matches a predetermined value, all the bits of the count Sb are compared with the determination value Sb. The number of bits forming the determination value Sc depends on the number of comparison target bits of the count Sb.

In the above-described detection circuit 104, the control signal Sa is supplied to the counter circuit 221. Instead, the control signal Sa may be supplied to the oscillation circuit 210. For example, it is also possible to replace one of the plurality of inverter circuits forming the ring oscillator circuit with one NAND circuit, and supply the control signal Sa to this NAND circuit. In this case, the ring oscillator circuit does not oscillate while the control signal Sa is Low, and oscillates while the control signal Sa is High.

As described above, the detection circuit 104 can be formed by only logic circuits by using the ring oscillator circuit in the oscillation circuit 210, and the counter circuit 221 and the comparison circuit 222 formed by the AND circuit in the determination circuit 220. It is possible to make the analysis of the circuit configuration more difficult by separately laying out these logic circuits on the semiconductor substrate 101.

FIG. 9 shows an example in which the detection circuit 104 is divided. On the semiconductor substrate 101, the detection circuit 104 is divided into, for example, ten circuit blocks 104a to 104j, and they are dispersed in the blocks of the control circuit 103 and processing circuit 108. Some of the circuit blocks 104a to 104j may or may not be arranged in the block of the memory circuit 102. Since the control circuit 103 and processing circuit 108 are so-called logic circuits, they are laid out on the semiconductor substrate 101 at random to some extent. When the detection circuits 104 are dispersed in these regions, therefore, the risk that the detection circuits 104 are specified by observing the configurations of the logic circuits is low. In the memory circuit 102, however, individual bits forming the memory are regularly arranged in the form of an array in many cases. If the detection circuits 104 are dispersed in the memory circuit 102 in which the bits are thus regularly arranged, the regularity of the arrangement of the memory circuit 102 is disturbed, and there is the risk that the detection circuits 104 are specified by observing the disturbance of the regularity. Accordingly, the detection circuits 104 may be arranged not in the memory circuit 102 but in the regions where the control circuit 103 and processing circuit 108 are arranged. In the embodiment, the detection circuits 104 are arranged in both the control circuit 103 and processing circuit 108. However, the detection circuits 104 may also be arranged in one of the control circuit 103 and processing circuit 108. Also, if there is another logic circuit portion, the detection circuits 104 can be arranged in that portion.

Next, modifications of the shape of the electrically conductive pattern 105 will be explained below with reference to FIGS. 6A to 6F. All electrically conductive patterns to be explained below can be formed by the critical dimension of the semiconductor process of manufacturing the semiconductor integrated circuit device 100. Also, points A and B of each electrically conductive pattern respectively correspond to the points A and B of the electrically conductive pattern 105 shown in FIG. 1.

Figure 6A:
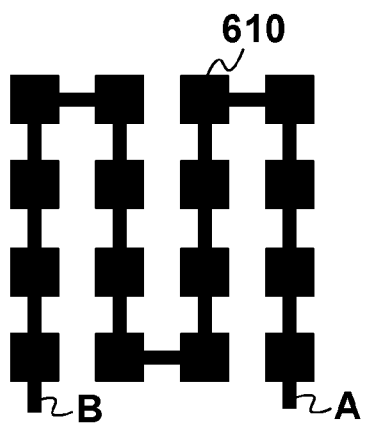
FIGS. 6A to 6F are views for explaining modifications of the shape of an electrically conductive pattern 105 of the embodiment of the present invention.
Figure 6B:
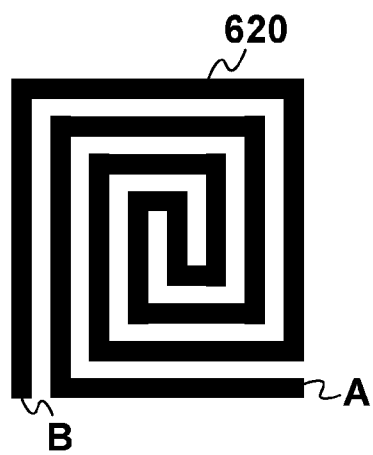
Figure 6C:
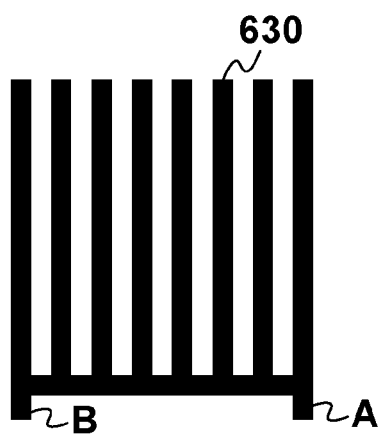
Figure 6D:
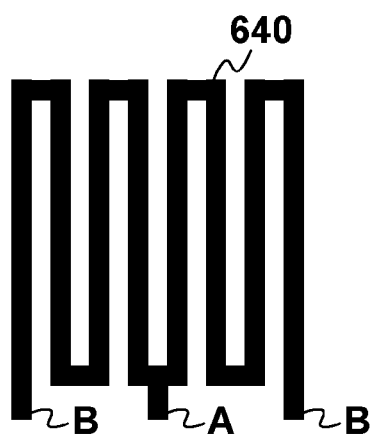
Figure 6E:
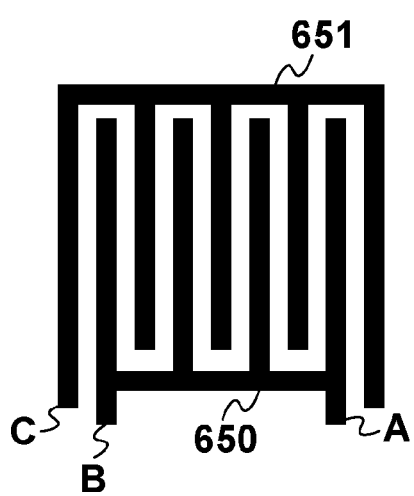
Figure 6F:
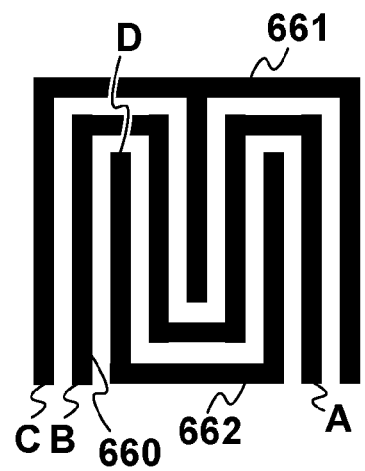

An electrically conductive pattern 610 shown in FIG. 6A has a shape in which a plurality of rectangular patterns are connected by electrically conductive lines thinner than the rectangular patterns. The electrically conductive pattern 610 can increase the parasitic capacitance while suppressing the increase in parasitic resistance. The plurality of rectangular patterns may have different sizes. An electrically conductive pattern 620 shown in FIG. 6B has a pattern that spirally extends from the point A positioned in the outer periphery toward the central portion, and then spirally extends from the central portion toward the point B positioned in the outer periphery. An electrically conductive pattern 630 shown in FIG. 6C has a comb-shaped pattern. An electrically conductive pattern 640 shown in FIG. 6D has a pattern in which one electrically conductive line meanders. The point A is positioned near the center of this electrically conductive line, and the point B is positioned at each of the two ends. An electrically conductive pattern 650 shown in FIG. 6E has a comb shape and is meshed with an electrically conductive pattern 651 having another comb shape. A point C of the electrically conductive pattern 651 is connected to a reference potential line (for example, GND). This arrangement can increase the parasitic capacitance of the electrically conductive pattern 650. An electrically conductive pattern 660 shown in FIG. 6F has a pattern in which one electrically conductive line meanders, and electrically conductive patterns 661 and 662 are arranged parallel to the electrically conductive pattern 660. A point C of the electrically conductive pattern 661 and a point D of the electrically conductive pattern 662 are connected to a reference potential line (for example, GND). This arrangement can increase the parasitic capacitance of the electrically conductive pattern 650.

Figure 7:
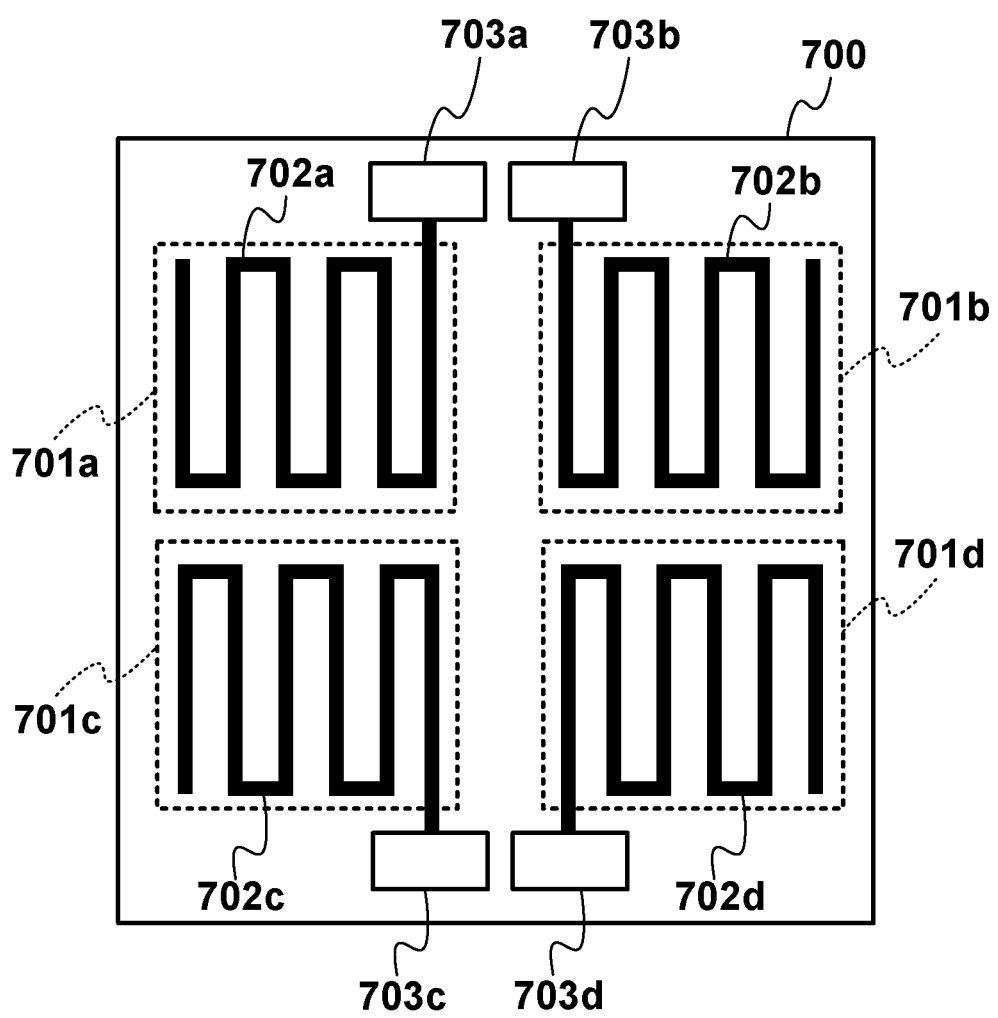
FIG. 7 is a view for explaining an example of the detailed configuration of the detection circuit of the embodiment of the present invention.

In the example shown in FIG. 1, the arrangement in which one electrically conductive pattern 105 is formed over the circuit block 106 is explained. However, the electrically conductive pattern formed on the circuit block 106 may also be divided into a plurality of portions. An example of an arrangement including a plurality of electrically conductive patterns will be explained below with reference to FIG. 7. Referring to FIG. 7, four electrically conductive patterns 702a, 702b, 702c, and 702d are respectively formed on different regions 701a, 701b, 701c, and 701d on a semiconductor substrate 700. Each of the electrically conductive patterns 702a to 702d corresponds to the electrically conductive pattern 105 explained with reference to FIG. 1, and the modifications explained with reference to FIGS. 6A to 6F are applicable. The electrically conductive patterns 702a, 702b, 702c, and 702d are respectively connected to detection circuits 703a, 703b, 703c, and 703d. Each of the detection circuits 703a to 703d corresponds to the detection circuit 104 described above. The electrically conductive patterns 702a to 702d may have different circuit constants. The electrically conductive patterns 702a to 702d may partially or entirely overlap each other. This can make analysis of a circuit block on which the electrically conductive patterns 702a to 702d overlap each other more difficult.

In the above-described example, the arrangement in which the analysis of the circuit block 106 formed on the semiconductor substrate 101 is made difficult by forming the electrically conductive pattern 105 over the circuit block 106 is explained. However, when manufacturing a semiconductor integrated circuit device by mounting the semiconductor substrate 101 on a mounting board, the circuit block 106 may be analyzed from the back side of the semiconductor substrate 101. The operation state of a transistor can be confirmed from the back surface of the semiconductor substrate 101 by using recent analytical techniques such as an LVP (Laser Voltage Probing) method or a back side emission microscope. Therefore, in another embodiment of the present invention to be explained with reference to FIG. 8, an electrically conductive pattern protects the back surface of the semiconductor substrate 101 as well.

Figure 8:
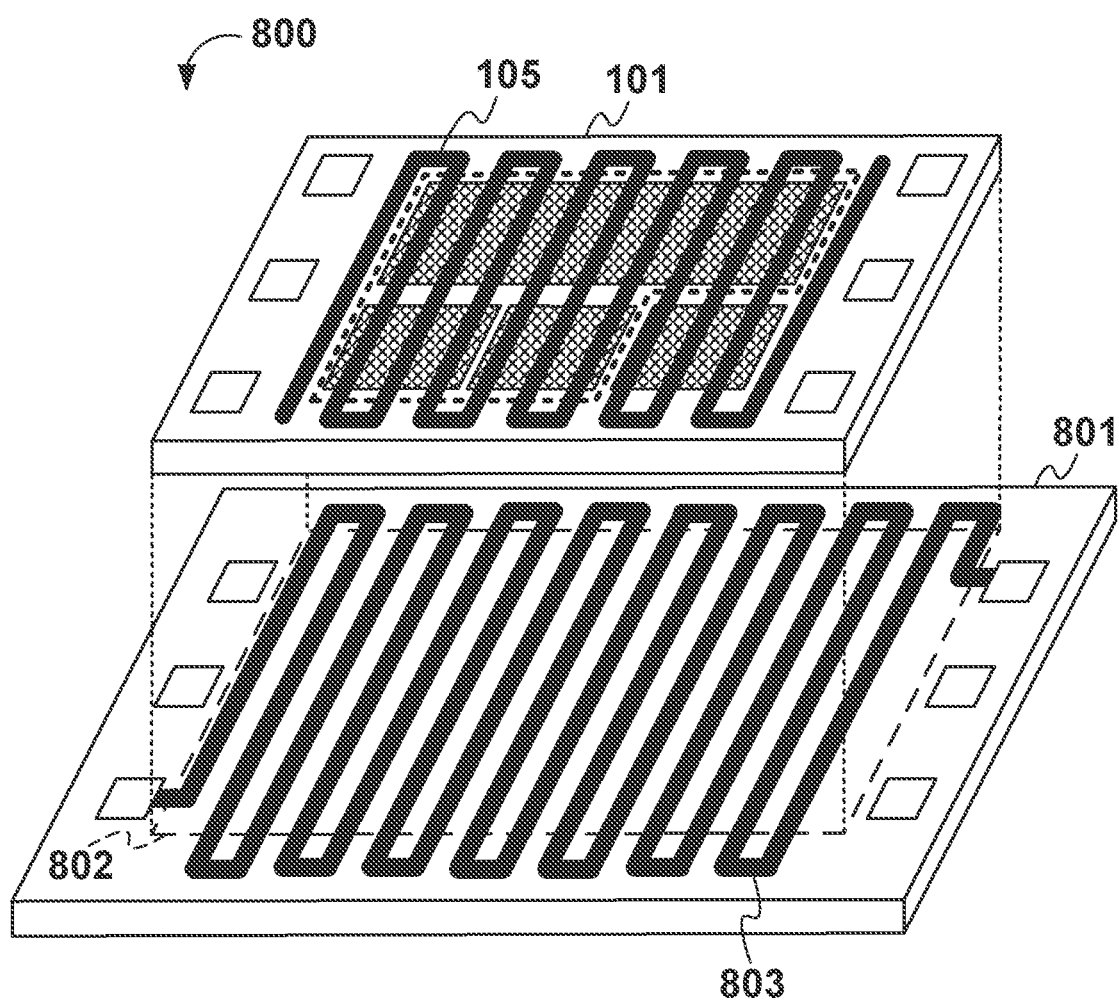
FIG. 8 is a view for explaining another example of the arrangement of the semiconductor integrated circuit device of the embodiment of the present invention.

A semiconductor integrated circuit device 800 shown in FIG. 8 is manufactured by mounting the semiconductor substrate 101 on a mounting board 801. An electrically conductive pattern 803 is formed over a region 802 of the mounting board 801 on which the semiconductor substrate 101 is to be mounted. The electrically conductive pattern 803 can be formed on the entire surface of the region 802 as shown in FIG. 8, and can also be formed on at least a portion of the region 802. When the electrically conductive pattern 803 is formed on only a portion of the region 802, the security of that portion improves. The arrangement of the electrically conductive pattern 803 is the same as that of the electrically conductive pattern 105, and a repetitive explanation will be omitted. The electrically conductive pattern 803 can be connected to the detection circuit 804 formed on the semiconductor substrate 101. Thus, the oscillation circuit 210 oscillates at an oscillation frequency determined by the circuit constant of the electrically conductive pattern 105 and that of an electrically conductive pattern 803. If at least one of the electrically conductive patterns 105 and 803 is altered, therefore, the oscillation frequency of the oscillation circuit 210 changes, and the detection circuit 104 can detect the alteration.

Also, the semiconductor substrate 101 is mounted on the mounting board 801 such that the back surface of the semiconductor substrate 101 faces the region 802. This makes it possible to protect the front side of the semiconductor substrate 101 by the electrically conductive pattern 105, and protect the back side of the semiconductor substrate 101 by the electrically conductive pattern 803. The electrically conductive patterns 105 and 803 may be connected to different detection circuits. In this case, outputs from these detection circuits are input to the control circuit 103. If at least one detection circuit outputs a signal indicating the detection of an alteration, the control circuit 103 can make data stored in the memory circuit 102 unusable. The detection circuit to be connected to the electrically conductive pattern 803 can be positioned on the semiconductor substrate 101, and can also be positioned on the mounting board 801. In addition, in this embodiment, the electrically conductive pattern 803 can be formed on the surface of the mounting board 801, and can also be formed in an interlayer of a multilayered circuit board.

In the various embodiments of the present invention as described above, it is possible to detect that an electrically conductive pattern formed on a circuit block has been altered. To analyze the circuit block, the electrically conductive pattern must be altered. Even when using a processing apparatus such as the FIB apparatus, however, it is very difficult to alter the electrically conductive pattern while maintaining its circuit constant. Accordingly, the present invention detects the change in oscillation frequency determined by the circuit constant of the electrically conductive pattern. This makes it possible to detect the alteration of the electrically conductive pattern more accurately, and as a consequence improve the security of data held in the semiconductor integrated circuit device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-197143, filed Sep. 2, 2010 and 2011-138894, filed Jun. 22, 2011, which are hereby incorporated by reference herein in their entirety.

What is claimed is:

1. A semiconductor integrated circuit device comprising:
a semiconductor substrate;
a circuit block formed on said semiconductor substrate;
an electrically conductive pattern formed on at least a portion of said circuit block that is to be protected, with said portion to be protected being between said electrically conductive pattern and said semiconductor substrate;
an oscillation circuit connected to said electrically conductive pattern, and configured to oscillate at an oscillation frequency determined by a circuit constant of said electrically conductive pattern; and
a detection circuit configured to test the oscillation frequency of said oscillation circuit to determine whether the oscillation frequency of said oscillation circuit lies with a preset range, and to make a determination that said electrically conductive pattern has been altered if the oscillation frequency does not lie within the preset range,
wherein said detection circuit comprises a counter circuit which counts the oscillation frequency of said oscillation circuit.

2. The device according to claim 1, wherein said circuit block comprises:
a memory circuit configured to hold data; and
a control circuit configured to control access to the data held in said memory circuit, and
wherein said control circuit is further configured to perform one of an operation of resetting the data held in said memory circuit and an operation of inhibiting access to the data held in said memory circuit, if it is detected that said electrically conductive pattern has been altered.

3. The device according to claim 1, wherein said oscillation circuit comprises a ring oscillator circuit having a plurality of odd-numbered inverter circuits connected in the form of a ring via said electrically conductive pattern.

4. The device according to claim 1, wherein the circuit constant includes a parasitic resistance and parasitic capacitance of said electrically conductive pattern.

5. The device according to claim 1, further comprising a plurality of said electrically conductive patterns and of said oscillation circuits, wherein said plurality of electrically conductive patterns are arranged over said circuit block, and wherein each of said electrically conductive patterns is connected with a respective one of said oscillation circuits.

6. The device according to claim 1, wherein said detection circuit is divided into a plurality of circuits, and said plurality of circuits are dispersed in said circuit block.

7. A semiconductor integrated circuit device comprising:
a semiconductor substrate;
a circuit block formed on said semiconductor substrate;
an electrically conductive pattern formed on at least a portion of said circuit block that is to be protected, with said portion to be protected being between said electrically conductive pattern and said semiconductor substrate;
an oscillation circuit connected to said electrically conductive pattern, and configured to oscillate at an oscillation frequency determined by a circuit constant of said electrically conductive pattern; and
a detection circuit configured to test the oscillation frequency of said oscillation circuit to determine whether the oscillation frequency of said oscillation circuit lies with a preset range, and to make a determination that said electrically conductive pattern has been altered if the oscillation frequency does not lie within the preset range,
wherein said oscillation circuit comprises a ring oscillator circuit having a plurality of odd-numbered inverter circuits connected in the form of a ring, a first portion of said electrically conductive pattern is connected to said ring oscillator circuit, and a second portion of said electrically conductive pattern is connected to a reference potential line.

8. The device according to claim 7, wherein said oscillation circuit comprises a ring oscillator circuit having a plurality of odd-numbered inverter circuits connected in the form of a ring via said electrically conductive pattern.

9. The device according to claim 7, wherein the circuit constant includes a parasitic resistance and parasitic capacitance of said electrically conductive pattern.

10. The device according to claim 7, further comprising a plurality of said electrically conductive patterns and of said oscillation circuits, wherein said plurality of electrically conductive patterns are arranged over said circuit block, and wherein each of said electrically conductive patterns is connected with a respective one of said oscillation circuits.

11. The device according to claim 7, wherein said detection circuit is divided into a plurality of circuits, and said plurality of circuits are dispersed in said circuit block.

12. The device according to claim 7, wherein said circuit block comprises:
a memory circuit configured to hold data; and
a control circuit configured to control access to the data held in said memory circuit, and
wherein said control circuit is further configured to perform one of an operation of resetting the data held in said memory circuit and an operation of inhibiting access to the data held in said memory circuit, if it is detected that said electrically conductive pattern has been altered.

* * * * *